July 24, 1962
N. KEISER
3,045,283
INJECTION MOLDING MACHINE
Filed April 7, 1959
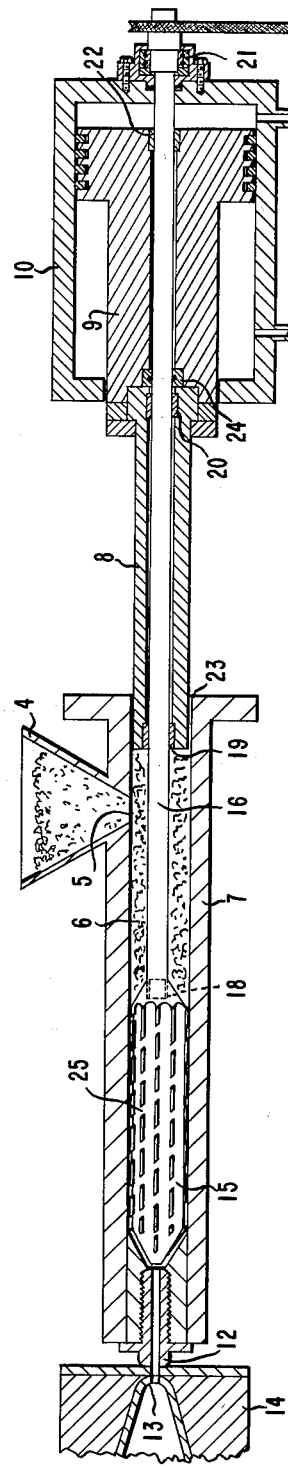
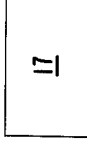
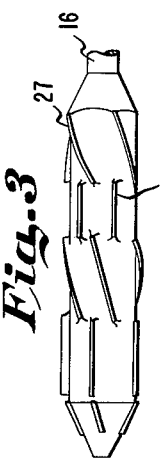
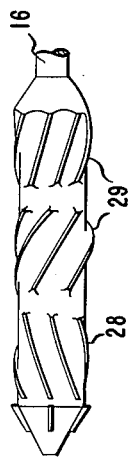
INVENTOR
NEIL KEISER
BY Earl L. Tyner Jr.
ATTORNEY

United States Patent Office 3,045,283
Patented July 24, 1962

3,045,283
INJECTION MOLDING MACHINE
Neil Keiser, Oxford, Pa., assignor to E. I. du Pont de Nemours and Company, Wilmington, Del., a corporation of Delaware
Filed Apr. 7, 1959, Ser. No. 804,715
2 Claims. (Cl. 18—30)

This invention relates to a device which improves the performance of injection molding machines and particularly to a mechanically rotated spreader which may be inserted in many existing molding machines.

In the initial development of injection molding, it was recognized that the method of obtaining improved heat transfer from the barrel of the molding machine to the thermoplastic resin being molded would lie in decreasing the thickness of the plastic layer through which heat must be passed and in increasing the area of heat transfer in the molding machine. This improvement was accomplished by the insertion of a spreader within the barrel of the machine such as shown in FIGURE 1, item 8 of U.S. Patent 2,798,256, issued on July 9, 1957, to Elysee Eynard of Lyon, France, and in FIGURE 1, item 22 of U.S. Patent 2,831,214, issued on April 22, 1958, to Thomas H. Eyles and Emilio Iacoboni for Foster Grant Company, Inc., Leominster, Massachusetts. Numerous other stationary spreader designs have been patented and in U.S. Patent 2,764,781, issued on October 2, 1956, to George W. Kelly for Columbus Plastic Products, Inc., Columbus, Ohio, a spreader is disclosed and claimed which rotates within the cylinder of the molding machine by virtue of a plurality of helically disposed lands and grooves which engage the molten plastic and cause the spreader to rotate as the plastic is forced through the lands and grooves by the ram. This spreader occupies a major portion of the cross-sectional area of the barrel to allow a positive contact of the lands and grooves with the plastic and in so doing requires additional ram pressure to force the molten plastic by the spreader. Obviously, the energy required to rotate the spreader must be extracted from the plastic. A dual bearing must be inserted within the barrel in contact with the plastic to hold the spreader in axial alignment with the barrel. Not only does the presence of unmelted plastic in the immediate zone of the spreader adversely affect its operation, but, also, a device of this nature has little self-purging ability. Some effort has been directed towards increasing the efficiency of a molding machine by rotating the means used to apply pressure to the plastic such as shown in U.S. Patent No. 2,704,380, issued to Alberto Cuzzi of Milan, Italy on March 22, 1955. This type of an integrated machine is vastly more complex than an ordinary molding machine and has poorer control over the feed due to the integration of the ram and screw.

An object of this invention is to provide a device which, when inserted in a suitable injection molding machine, markedly improves the mixing and dispersing efficiency and heat transfer characteristics of the molding machine. Another object of this invention is to provide a mechanism by which mechanical work, in addition to that supplied by the ram, may be applied to a plastic in an injection molding machine. A further object of this invention is to provide an apparatus which, when inserted in an injection molding machine according to the method described herein, reduces the pressure drop through the cylinder, increases the rate of purging, improves the physical and temperature uniformity of the melt, allows faster cycles, and permits operation at a lower barrel temperature as compared to the same machine using a stationary spreader. Other objects will appear hereinafter.

The above objects are accomplished in accordance with this invention by employing a rotating spreader in an injection molding machine having a barrel equipped with a means for feeding a thermoplastic into the barrel, a ram or other means for advancing the resin through the barrel, and a nozzle at the end of the barrel for directing the flow of the plasticated thermoplastic resin; the rotating spreader being axially aligned and longitudinally stationary within the barrel, and being equipped with a direct drive means operable to rotate the spreader. Channels and flights are placed on the outer surface of the spreader to provide a means for agitating the thermoplastic resin as the resin is forced through the barrel and over the rotating spreader.

More particularly, the above objects are accomplished by replacing an existing stationary spreader of a standard injection molding machine with a mixing spreader or torpedo axially aligned, rotatable within the barrel of the molding machine, and only longitudinally stationary therein during operation thereof. In most cases, the spreader is located in the downstream portion of the barrel near the discharge end of the machine and extends approximately ⅓ to ½ the total length of the cylinder as measured on an axial line from the discharge end of the barrel to the center point of the means for supplying the resin to the barrel. The spreader is equipped with a plurality of flights and channels on the outside surface therefor and in a preferred embodiment the flights wipe the entire inner surface of the barrel which lies adjacent to the spreader. The depth of the channels as measured on a radial line from the axis of the spreader need not be the same, but the depth of the channels should be between 0.05–0.15 times the outside diameter of the spreader.

A more complete understanding of the rotating spreader or torpedo of this invention may be had by referring to the drawing attached hereto, and made a part of this specification. FIGURE 1 is a cross-sectional elevation view of a standard injection molding machine which is equipped with the rotating spreader of this invention. FIGURE 2 is a view of a standard stationary spreader which was used herein as the control for comparison purposes. FIGURES 3 and 4 are views of alternate designs for spreaders which are operable in the apparatus of this invention.

In this specification some of the dimensions of the spreader and the various accessories therewith are assigned a range of values which are considered as the optimum range for this invention and for the most part are based upon the outside diameter (D) of the spreader. This scheme of dimension designation should allow one skilled in the art to construct the optimum equipment design for any size molding machine by selecting a set of dimensions within the ranges indicated herein.

The term "upstream" as used herein refers to the direction opposite to the main mass flow of plastic through the barrel and the term "plasticated" refers to that state of a normally solid compound in which its behavior is that of a viscous or viscoelastic fluid. FIGURE 1 shows a standard injection machine which as been modified according to this invention. The parts of the standard machine include the feed hopper 4 which retains a supply of the unplasticated material and allows this material to drop through the opening 5 into the inner portion 6 of the barrel 7. An extensible reciprocating ram 8 forces the material downstream by virtue of the pressure applied by a hydraulic piston 9 connected to the ram 8 and contained in the cylinder 10. The means for supplying variable pressure hydraulic fluid to the cylinder 10 at points 11 and the apparatus used to control the movement and pressure of the fluid are not shown since such means are common to machines of this type and well known in the art. Attached to the downstream end of the barrel 7 is a nozzle 12 which communicates the interior of the injection cylinder chamber with cavity 13 of the mold 14. A means, common to machines of this type, is provided to allow timed opening and closing of the mold 14 as the plasticated material which is introduced into the mold chamber 13 through the nozzle 12 has sufficiently hardened to be ejected from the chamber 13 and to allow another shot of plasticated material to be introduced therein. Numerous variations in the design of the mold 14 and the nozzle 12 are readily apparent, and since the design of these components is not a critical feature of this invention, it is believed that practically any design may be used by one aware of the desired application of the invention. In reference to the instant invention, the inner downstream portion 6 of the barrel 7 is provided with a spreader or torpedo 15 which is axially disposed and radially rotatable within the barrel 7. The spreader can occupy ¼ to ⅞ of the barrel length, but preferably occupies from ⅓ to ½ of the total barrel length as measured on an axial line extending from the center point of the opening 5 to the beginning of the taper of the barrel to the nozzle 12. In the embodiment as shown, the spreader 15 is fixedly attached at its upstream end to a shaft 16. The shaft 16 may be integrally formed with the spreader 15 but for ease of installation is usually joined to the spreader by screw threads as indicated by the dotted lines at 18. The shaft is axially aligned and concentric with the barrel 7, the ram 8, and the hydraulic piston 9. The shaft extends through the cylinder 10 and is thereafter attached to a means 17 for rotating the shaft at a predetermined speed. The optimum rotational speed may be easily determined and depends upon the particular operation. For most molding operations the shaft is rotated between 20 and 70 r.p.m. Although some operations may require speeds of 10–120 r.p.m. Generally, the diameter of the shaft should be small enough to allow the use of a ram with maximum cross-sectional area and resulting high volume throughput per stroke, but the shaft must be large enough to provide stability for the spreader, to withstand the axial thrust and to transmit the necessary torque to the spreader. As shown in Example I below, a satisfactory shaft diameter for use with a spreader having an outside diameter of 2³⁄₁₆ inches is 1 inch. A thrust-bearing and seal arrangement 21 is attached to the cylinder 10 to add further stability to the shaft by preventing longitudinal movement thereof and to prevent leakage of the hydraulic fluid from the cylinder 10. A seal 24 is provided to further prevent the leakage of hydraulic fluid into the molding cylinder. The seal arrangement 24 is usually similar to the seal shown at 21. Bushings are provided at points 19, 20 and 22 with clearances in the range of 0.005 to 0.008 inch between the bushings and the shaft. A slightly greater clearance is used between the ram and shaft along the portion which lies between the bushings 19, 20 and 22. The increased clearance permits relatively easy rotation of the shaft while the bushings add necessary stability to the shaft and spreader. The clearance between the ram and the barrel at 23 is standard for machines of this type.

The configuration of the flights and grooves 25 on the outside surface of the spreader 15 is not a critical feature of this invention, although, in the preferred practice of this invention, the entire inner surface of the barrel adjacent to the spreader should be wiped by at least one of the flights during one revolution of the spreader and the flights should be interrupted along the spreader. The depth of the grooves 25, as measured on a radial line from the longitudinal axis of the spreader, may be varied from 0.02–0.25 times the outside diameter (D) of the spreader. The preferred depth is 0.05–0.15 (D).

FIGURE 2 shows a standard stationary spreader used in the machine as described in Example I below before modification, to obtain a base-line for comparison with the performance of the rotating device of this invention. FIGURES 3 and 4 show additional spreader designs which are operable in this invention. FIGURE 3 shows a series of alternating longitudinal flights 26 and helical flights 27 which are arranged so that the inner surface of the barrel adjacent to the spreader is wiped by at least one of the flights during one revolution of the spreader. FIGURE 4 shows a spreader with a series of helical flights with the downstream series 28 having a hand opposite to the upstream series 29. The reversed hand of the downstream series permits the spreader to induce a slight back pressure during rotation. When plastics which possess low melt viscosity are used in the machine, the slight back pressure produced by a spreader of this design reduces drooling of the plastic from the nozzle when the mold is separated therefrom as occurs between injection cycles.

In addition to the designs disclosed in the attached drawing, it has been found that the exterior designs of other mixing devices, such as the one disclosed in U.S. Patent No. 2,453,088, issued on November 2, 1948, to Frederick E. Dulmage and assigned to the Dow Chemical Company, Midland, Michigan, are operable on the rotating spreader of this invention. If the lands on the outer surface of the spreader are helically disposed, such as the lands shown in the above-mentioned Dulmage patent, the hand of the lands on the downstream end of the spreader may be reversed to accomplish a result which is similar to that realized by using the spreader shown in FIGURE 4.

The following examples are intended to illustrate and not to restrict the present invention. The resins used in the following examples are well known molding resins in the form of molding powder. The melt index of the polyethylene used in the examples was determined according to the tentative A.S.T.M. Specification No. D–1238 and the grade of the polymethylmethacrylate was determined by A.S.T.M. No. D–768–56–T.

EXAMPLE I

In this example the effectiveness of the spreader of this invention was compared with that of a standard stationary spreader. The temperature variation of the plastic melt and the pressure drop encountered in the molding operation using polyethylene with a melt index of 12.0 were used as the measure of effectiveness of the two machines. A standard six ounce Watson-Stillman injection molding machine (Model 6–B) containing the stationary spreader as shown in FIGURE 2 was used to obtain the base-line data. The inside diameter of the barrel was 2³⁄₁₆ inches and the length was 21 inches, with the stationary spreader occupying 15 inches of the downstream portion of the barrel. After the base-line data were obtained a spreader of the design shown in FIGURE 1 was installed. The spreader had an overall length of 10¹⁵⁄₁₆ inches, a flighted length of approximately 8¼ inches, an outside diameter of 2⅛ inches, a root diameter of 1¾ inches, a downstream end fashioned as a truncated cone with an interior apex angle of 53° ending in a flat circular surface having a diameter of ⅜ inch, and an upstream end also fashioned as a truncated cone having an interior apex angle of 60° ending in a flat circular surface with a diameter of 1.002 inches. The upstream end of the rotating spreader was drilled and tapped along the center line to receive the threaded portion of a shaft of 1 inch in diameter which was turned down on the threaded portion to ¹⁵⁄₁₆ inch for a distance of approximately 1³⁄₁₆ inches. The shaft was approximately 72 inches long and was inserted through aligned holes in the ram, the piston, and the cylinder, using a diameter clearance of ¹⁄₆₄ inch. Bronze bushings, having a diameter clearance with the shaft of 0.005 inch, were installed in the locations shown at points 19, 20 and 22 in FIGURE 1. A compressor O ring seal was installed in the piston and located as shown at point 24 in FIGURE 1. A thrust-bearing having an outside diameter of approximately 6 inches was mounted on the cylinder with an O ring seal between the bearing and the cylinder and the bearing and the shaft. This bearing and seal is shown at 21 in FIGURE 1. A sprocket on the end of the shaft projecting from the hydraulic cylinder was driven by a roller chain which was connected through a gear reducer to a 3 H.P. variable speed drive. Approximately 25 pounds of polyethylene were used per run and the data in Table 1 were taken after the machine had reached a steady-state. The absolute values given in this table will vary with the plastic used for evaluation, but the observed differences in operation will be proportionately similar.

Table 1 shows the temperature of the cylinder and the average temperature of the plastic leaving the machine, the melt temperature variation of the plastic leaving the machine, and the observed pressure drop for the control as shown in FIGURE 2 and the spreader design shown in FIGURE 1. Spreader designs, such as shown in FIGURES 3 and 4, were comparatively tested in the manner described and were found to give similar improvements over a stationary spreader.

*Table 1*

| Spreader | Rotational Speed (r.p.m.) | Cylinder Temperature (° F.) | Average Discharge Temperature of Plastic Melt (° F.) | Variation At Discharge (° F.) | Pressure Drop Across Cylinder (p.s.i.) |
|---|---|---|---|---|---|
| Control (Fig. 2) | 0 | 400 | 390 | 40–60 | 6,200 |
| Spreader (Fig. 1) | 25 | 385 | 390 | 10 | 1,800 |

As shown in the above table the temperature uniformity of the melt was markedly increased when the rotating device of this invention was employed and, furthermore, a lower cylinder temperature was required to obtain equivalent melt temperature. A visual inspection of the articles which were molded during this test showed that the injected plastic was more homogeneous in the case of the rotating spreader. It was also determined that the production rates of the machine could be doubled when using the rotating spreader without adversely affecting the temperature uniformity of the melt and the physical uniformity of the molded objects. The maximum satisfactory production rate using the above factors as a criteria was 21 pounds per hour in the case of the control and 43 pounds per hour for the rotating spreader.

Another method for evaluating injection molding machines is given in the article "Temperature and Pressure Measurement in Injection Machine Heating Cylinder" by Beyer, Dahl, and McKee, Modern Plastics, vol. 32, No. 8, 9, and 10 (1955). In the above article the reported pressure drop across the cylinder of a standard machine at 10,000 p.s.i. ram pressure is 8500 p.s.i. with a melt temperature variation of 47° F. As shown in the above table, the pressure drop for the control spreader was 6200 p.s.i. with a melt temperature variation of 53° F. and 1800 p.s.i. with a melt temperature variation of 10° F. for the rotating spreader of this invention. This is a significant improvement in the performance of an injection molding machine.

EXAMPLE II

In this example the weight of plastic required to purge the standard injection machine as described in Example I is compared in Table 2 below with the weight required to purge the machine after the installation of the rotating spreader as shown in FIGURE 1 and described above. The required amount of purge is defined as the weight of purge resin that must be added to a machine filled with production resin to effect a complete change over in the molten extrudate from the production resin to the purge resin. In the runs marked with an asterisk the pigment was added to the molding powder by tumbling the granules with the pigment before introduction of the granules into the machine. Prior to the instant invention, the blue pigment could not be satisfactorily mixed with the polymer by mere tumbling followed by injection molding; however, this pigment was well dispersed in the articles which were molded using the rotating spreader. In both cases, the molding machine was started up with the initial production resin and adjusted to give satisfactory operation, and thereupon the purge resin was added to the machine and the weight melt emerging from the nozzle was noted until a complete transition of the melt to the purge resin was obtained.

*Table 2*

| Production Resin in Machine | Purge Resin Added | Purge Requirements in Pounds | |
|---|---|---|---|
| | | Control | Rotating Spreader |
| Polyethylene (M.I. 12), Black Color. | Polyethylene (M.I. 12), Natural Color. | 45–50 | 1 |
| Polyhexamethyleneadipamide, Yellow Color. | Polyhexamethyleneadipamide, Natural Color. | 20–25 | 2 |
| Polyehtylene (M.I. 12), Natural Color. | Polymethylmethacrylate (Grade 8), Natural Color. | 45–50 | 3 |
| Polymethylmethacrylate (Grade 8), Blue Color.* | Polymethylmethacrylate (Grade 8), Natural Color Crystal. | 20–25 | 2 |
| Polyoxymethylene Diacetate (M.W. 45,000), Blue Color.* | Polyoxymethylene Diacetate (M.W. 45,000), Natural. | 20–25 | 2 |
| Polyoxymethylene Diacetate (M.W. 45,000), Black Color. | Polyoxymethylene Diacetate (M.W. 45,000), Natural. | 20–25 | 5 5 |

M.I.=Melt Index.
M.W.=Approximate number average molecular weight.

A significant reduction in purge requirements is obtained by the use of the device of this invention. Many other common resins used for injection molding showed reductions in purge requirements which were comparable to the above.

EXAMPLE III

In injection molding operations the uniformity of heat transfer to the plastic and the mixing of the plastic are critical considerations. This is particularly true when it is desired to obtain thorough dispersion of pigments, fillers, dyes, or other polymers in the base resin. Table 3 below, shows the effect of the rotating spreader upon the uniformity of the extrudate in the case of three common thermoplastics. In each case an additive was mixed with the molding powder by dry tumbling the powder in the presence of the additive. The mixture was then molded in the standard machine and in the modified machine described in Example I. Various objects, such as tumblers, combs and test chips were molded and the general physical appearance of the objects were observed. The effect of the rotating spreader is apparent regardless of the particular design of the object which is molded.

Table 3

| Resin | Additive | Object Molded | Physical Appearance of Molded Objects | |
|---|---|---|---|---|
| | | | Stationary Spreader | Rotating Spreader |
| Polyethylene (M. I. 12), Natural Color (10 Pounds). | Carbon Black (25 grams). | Chip (4" in diameter x ⅛" thick). | Streaked with Black | Homogenous Black Color. |
| Polyhexamethyleneadipamide (10 Pounds). | Cadmium Red Pigment (0.8 gram), Titanium Dioxide (11.8 grams). | Tumbler. | Areas of Undispersed Pigment. | Uniform Color Dispersion. |
| Polymethylmethacrylate, High Molecular Weight (Approximately 180,000) (8.5 Pounds). | Polymethylmethacrylate, Low Molecular Weight (Approximately 10,000) (1.5 Pounds). | Chip (2" in Diameter x ⅛" Thick). | Cloudy. | Clear. |

The enhanced physical appearance of the objects molded using the apparatus of the present invention is readily apparent upon examination of the above results.

EXAMPLE IV

The dimensional distortion which occurs in some molded objects is due, in a large part, to the stresses which are molded into the object. A melt of non-uniform temperature is the chief cause of this stress. In this example, there is a comparison of the dimensional stability of toothbrush containers and lids molded using the control spreader, and molded using the rotating spreader. The distortion is given in inches deviation from the sizes prescribed by the die size allowing for known shrinkage. Polyethylene with a melt index of 12 was used. In the case of the boxes and lids, about 7 inches long, 1½ inches wide, and ¾ inch high, which were molded using the control spreader the length deviated 0.030 inch and the width deviated 0.090 from the dimensions dictated by the mold. The flatness of the bottom of the boxes deviated 0.060 inch from the substantially true flatness of that portion of the mold. The boxes and lids which were molded using the rotating spreader deviated only 0.010 inch in length and 0.025 inch in width with substantially true flatness for the bottom of the box. The decrease in internal stress is readily apparent in view of this example.

As described and illustrated hereinabove, the use of an externally rotated spreader in a suitable injection molding machine results in major improvements in the effectiveness of the machine. In conventional molding equipment a melt of non-uniform temperature is injected into the mold due to a temperature gradient in the plastic. When the objects which are molded by the prior art techniques have cooled, the original temperature variance of the melt results in internal stresses in the object. The mixing action of the rotating spreader practically eliminates this melt temperature variance. The rotating spreader removes the hot stagnant film adjacent to the barrel wall by virtue of the wiping action of the flights and improves the heat transfer coefficient for the molding machine. The continuous removal of this film also reduces the degradation of heat sensitive materials. Additional heat may be supplied by mechanical work of rotation and in combination with the improved heat transfer may, in most cases, double the plastifying capacity of a given machine. A marked reduction in pressure drop across the barrel (in some cases as high as 80%) is obtained with the rotating spreader. This reduction in pressure drop allows faster mold filling rate at normal piston pressures and in combination with the aforementioned benefits, results in a more efficient machine operation. Another remarkable feature of this invention is the reduction in plastic required to purge the machine during change-over from one type of resin to another as amply illustrated in Example II. The savings from this feature are readily apparent. An additional feature is the improved mixing of additives to the base resin which allows natural resins to be dry tumbled with the additive and thereafter directly injection molded in the apparatus of this invention. As illustrated in Examples III and IV, the internal stresses in molded objects are reduced, and their physical appearance is greatly enhanced by the mixing operation of the rotating spreader. This improvement in mixing is accomplished without increasing the pressure drop through the cylinder as opposed to prior art devices in which an improvement in mixing was necessarily followed by an increase in pressure drop through the cylinder.

In light of the above disclosure, one skilled in the art should recognize that the means as shown in FIGURE 1 for driving the spreader may be modified by various methods without departing from the spirit of this invention and that other designs for the outer surface of the spreader may also be used in the practice of this invention. The spreader may be driven by means other than those shown in the drawings, for example by a shaft which is extended through the nozzle end of the machine, or by a gear device engaging the spreader through the wall of the cylinder.

I claim:

1. In an injection molding machine comprising a barrel equipped with a means of feeding a thermoplastic resin into the upstream portion of said barrel and a means of discharging said resin at the downstream end of said barrel, a ram axially aligned with said barrel for advancing said resin from the upstream to the downstream portion of said barrel and a suitable means for actuating said ram, the improvement which comprises a spreader substantially axially aligned and rotatable within said barrel and longitudinally stationary therein during operation thereof; said spreader being equipped with a plurality of flights and at least one helically disposed channel extending over the outer surface thereof and being exclusively supported and rotated by a shaft substantially axially aligned with said barrel and fixedly attached to said spreader, said flights arranged in combination to wipe the entire inner surface of said barrel lying adjacent to said spreader, said shaft extending upstream through said barrel and said ram and thereafter connected to a means of rotating the shaft independent of the movement of said ram.

2. In an injection molding machine comprising a heated barrel equipped with a means of feeding a thermoplastic resin into the upstream portion of said barrel, means of discharging said thermoplastic resin in a flowable condition at the downstream end of said barrel, a ram axially aligned with said barrel and movable within said barrel for advancing said resin under pressure from the upstream to the downstream portion of said barrel whereby said resin is at least partially melted and forced through said means of discharging said resin and a means to move said ram, the improvement which comprises a spreader axially aligned and rotatable within said barrel and longitudinally stationary during operation; said spreader occupying from ⅓ to ½ of the length of said barrel, located at the downstream portion of said barrel and equipped with a plurality of flights and at least one helically disposed groove on the outer surface; said flights in combination wiping the entire inner surface of said barrel lying adjacent to said spreader through each revolution of said spreader; said spreader being rotated by a shaft fixedly attached thereto; said shaft axially aligned with said barrel, extending upstream through said barrel, said ram, and said means for moving said ram along the coincident center line thereof, and thereafter connected to a means of rotating said shaft independent of the movement of said ram.

References Cited in the file of this patent

UNITED STATES PATENTS

| | | |
|---|---|---|
| 2,453,088 | Dulmage | Nov. 2, 1948 |
| 2,461,282 | Jobst | Feb. 8, 1949 |
| 2,764,781 | Kelly | Oct. 2, 1956 |

FOREIGN PATENTS

| | | |
|---|---|---|
| 1,003,948 | Germany | Mar. 7, 1957 |

UNITED STATES PATENT OFFICE
CERTIFICATE OF CORRECTION

Patent No. 3,045,283                                         July 24, 1962

Neil Keiser

It is hereby certified that error appears in the above numbered patent requiring correction and that the said Letters Patent should read as corrected below.

Column 2, line 27, for "therefor" read -- thereof --; column 4, lines 39 and 40, for "plastice" read -- plastic --; column 4, line 69, for "compressor" read -- compressed --; column 6, Table 2, first column, line 6 thereof, for "Polyehtylene" read -- Polyethylene --; same table, column 4, last line thereof, strike out "5".

Signed and sealed this 13th day of November 1962.

SEAL)
Attest:

ERNEST W. SWIDER                                    DAVID L. LADD
Attesting Officer                                         Commissioner of Patents